US012783158B2

(12) United States Patent
Xu et al.

(10) Patent No.: US 12,783,158 B2
(45) Date of Patent: Nov. 3, 2026

(54) DATA PROCESSING METHOD BASED ON PERSISTENT MEMORY REGION, STORAGE MEDIUM, AND PROCESSOR

(71) Applicant: Cloud Intelligence Assets Holding (Singapore) Private Limited, Singapore (SG)

(72) Inventors: Peng Xu, Hangzhou (CN); Zhongjie Wu, Beijing (CN); Yu Du, Shanghai (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 0 days.

(21) Appl. No.: 18/684,916

(22) PCT Filed: Nov. 10, 2022

(86) PCT No.: PCT/CN2022/131054
§ 371 (c)(1),
(2) Date: Feb. 20, 2024

(87) PCT Pub. No.: WO2023/103704
PCT Pub. Date: Jun. 15, 2023

(65) Prior Publication Data

US 2024/0361951 A1 Oct. 31, 2024

(30) Foreign Application Priority Data

Dec. 8, 2021 (CN) ......................... 202111495805.4

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ....... G06F 3/0656; G06F 3/061; G06F 3/0679
See application file for complete search history.

(56) References Cited

U.S. PATENT DOCUMENTS 11,474,741 B1 * 10/2022 Farhan .................. G06F 3/0644
2013/0111103 A1 5/2013 Dodson et al.
(Continued)

FOREIGN PATENT DOCUMENTS

CN 110727608 A 1/2020
CN 111475099 A 7/2020
CN 114356219 A 4/2022

OTHER PUBLICATIONS

1 English Translation of First Office Action, Chinese Application No. 202111495805.4, Jul. 2, 2024, pp. 1-5.
(Continued)

*Primary Examiner* — Edward J Dudek, Jr.
(74) *Attorney, Agent, or Firm* — Osha Bergman Watanabe & Burton LLP

(57) ABSTRACT

A data processing method, a storage medium, and a processor are provided that solve the technical problem of low efficient of data storage. The data processing method is applied to a storage engine, and involves determining that target data is transmitted from a target application to a first persistent memory region of a storage device, and sending a target instruction to the storage device. The target instruction is used for instructing the storage device to write the target data from the first persistent memory region into a memory of the storage device.

16 Claims, 8 Drawing Sheets

200

(56) References Cited

U.S. PATENT DOCUMENTS

| | | | | |
|---|---|---|---|---|
| 2018/0069923 | A1* | 3/2018 | Tsalmon | G06F 15/17331 |
| 2020/0004445 | A1* | 1/2020 | Benisty | G06F 3/0664 |
| 2020/0133897 | A1* | 4/2020 | Maroney | G06F 13/1668 |
| 2021/0208810 | A1* | 7/2021 | Manohar | G06F 3/0653 |
| 2022/0035738 | A1* | 2/2022 | Brandt | G06F 13/4282 |
| 2022/0100425 | A1* | 3/2022 | Ryu | G06F 3/0659 |
| 2022/0197833 | A1* | 6/2022 | Steinmetz | G06F 13/1668 |
| 2023/0056733 | A1* | 2/2023 | Nimmagadda | G06F 3/0679 |

OTHER PUBLICATIONS

International Search Report English Translation PCT/CN2022/131054, Jan. 18, 2023, pp. 1-2.

* cited by examiner

DATA PROCESSING METHOD BASED ON PERSISTENT MEMORY REGION, STORAGE MEDIUM, AND PROCESSOR

RELATED APPLICATIONS

The present invention is filed under 35 U.S.C. § 371 as the U.S. national phase of International Patent Application No. PCT/CN2022/131054, filed Nov. 10, 2022, which designated the United States and which claims the benefit of Chinese patent application No. 202111495805.4, filed with the China Patent Office on Dec. 8, 2021, which is incorporated herein by reference in its entirety.

TECHNICAL FIELD

The present application relates to the field of data processing, and especially to a data processing method, a storage medium, and a processor.

BACKGROUND

Currently, in storage engines, data is typically first transmitted to a host memory, or to an Apache Pass (abbreviated as AEP) memory, and then forwarded from the host memory or AEP to a storage device. This brings complexity and high costs to quality of service (QOS) optimization, thereby resulting in a technical problem of low efficiency for data storage.

SUMMARY

Embodiments of the present application provide a data processing method, a storage medium, and a processor, in order to at least solve the technical problem of low efficiency of data storage.

According to an aspect of the embodiments of the present application, a data processing method is provided. This method may be applied to a storage engine, and comprise: determining that target data is transmitted from a target application to a first persistent memory region of a storage device; and sending a target instruction to the storage device, wherein the target instruction is used for instructing the storage device to write the target data from the first persistent memory region into a memory of the storage device.

According to another aspect of the embodiments of the present application, another data processing method is provided. This method may be applied to a storage device, and comprise: receiving, in a first persistent memory region of the storage device, target data from a target application; and writing, based on a target instruction from a storage engine, the target data from the first persistent memory region into a memory of the storage device.

According to another aspect of the embodiments of the present application, another data processing method is provided. This method may be applied to a storage engine, and comprise: determining, in response to a first determination instruction acting on an operation interface, that target data is transmitted from a target application to a first persistent memory region of a storage device; and displaying a storage result of the target data on the operation interface, wherein the storage result is used for indicating that the storage device writes the target data from the first persistent memory region into a memory of the storage device.

According to another aspect of the embodiments of the present application, another data processing method is provided. This method may be applied to a storage engine, and comprise: determining target data by calling a first interface, wherein the first interface comprises a first parameter, and a parameter value of the first parameter is the target data; determining that the target data is transmitted from a target application to a first persistent memory region of a storage device; sending a target instruction to the storage device, wherein the target instruction is used for instructing the storage device to write the target data from the first persistent memory region into a memory of the storage device; and outputting a storage result by calling a second interface, wherein the second interface comprises a second parameter, a parameter value of the second parameter is the storage result, and the storage result is used for indicating that the storage device writes the target data from the first persistent memory region into the memory.

According to another aspect of the embodiments of the present application, a data processing apparatus is provided. This apparatus may be applied to a storage engine, and comprise: a first determination unit for determining that target data is transmitted from a target application to a first persistent memory region of a storage device; and a first sending unit for sending a target instruction to the storage device, wherein the target instruction is used for instructing the storage device to write the target data from the first persistent memory region into a memory of the storage device.

According to another aspect of the embodiments of the present application, another data processing apparatus is provided. This apparatus may be applied to a storage device, and comprise: a receiving unit for receiving, in a first persistent memory region of the storage device, target data from a target application; and a writing unit for writing, based on a target instruction from a storage engine, the target data from the first persistent memory region into a memory of the storage device.

According to another aspect of the embodiments of the present application, another data processing apparatus is provided. This apparatus may be applied to a storage engine, and comprise: a second determination unit for determining, in response to a first determination instruction acting on an operation interface, that target data is transmitted from a target application to a first persistent memory region of a storage device; and a display unit for displaying a storage result of the target data on the operation interface, wherein the storage result is used for indicating that the storage device writes the target data from the first persistent memory region into a memory of the storage device.

According to another aspect of the embodiments of the present application, another data processing apparatus is provided. This apparatus may be applied to a storage engine, and comprise: a first calling unit for determining target data by calling a first interface, wherein the first interface comprises a first parameter, and a parameter value of the first parameter is the target data; a third determination unit for determining that the target data is transmitted from a target application to a first persistent memory region of a storage device; a second sending unit for sending a target instruction to the storage device, wherein the target instruction is used for instructing the storage device to write the target data from the first persistent memory region into a memory of the storage device; and a second calling unit for outputting a storage result by calling a second interface, wherein the second interface comprises a second parameter, a parameter value of the second parameter is the storage result, and the storage result is used for indicating that the storage device writes the target data from the first persistent memory region into the memory.

According to another aspect of the embodiments of the present application, a computer-readable storage medium is further provided. This computer-readable storage medium comprises a stored program, wherein the program, when run by a processor, controls a device where the computer-readable storage medium is located to execute the data processing method of embodiments of the present application.

According to another aspect of the embodiments of the present application, a processor is further provided. This processor is used for running a program, wherein the program, when run, executes the data processing method of embodiments of the present application.

The above summary is only for the purpose of illustration and is not intended to make limitations in any way. In addition to the schematic aspects, implementations and features described above, further aspects, implementations and features of the present application will be readily understood with reference to the drawings and the following detailed description.

BRIEF DESCRIPTION OF THE DRAWINGS

In the drawings, unless otherwise specified, the same reference numerals throughout several drawings denote the same or similar parts or elements. These drawings may not necessarily be drawn to scale. It should be understood that these drawings only depict some implementations disclosed according to the present application and should not be regarded as limitations of the scope of the present application.

DETAILED DESCRIPTION

Figure 1:
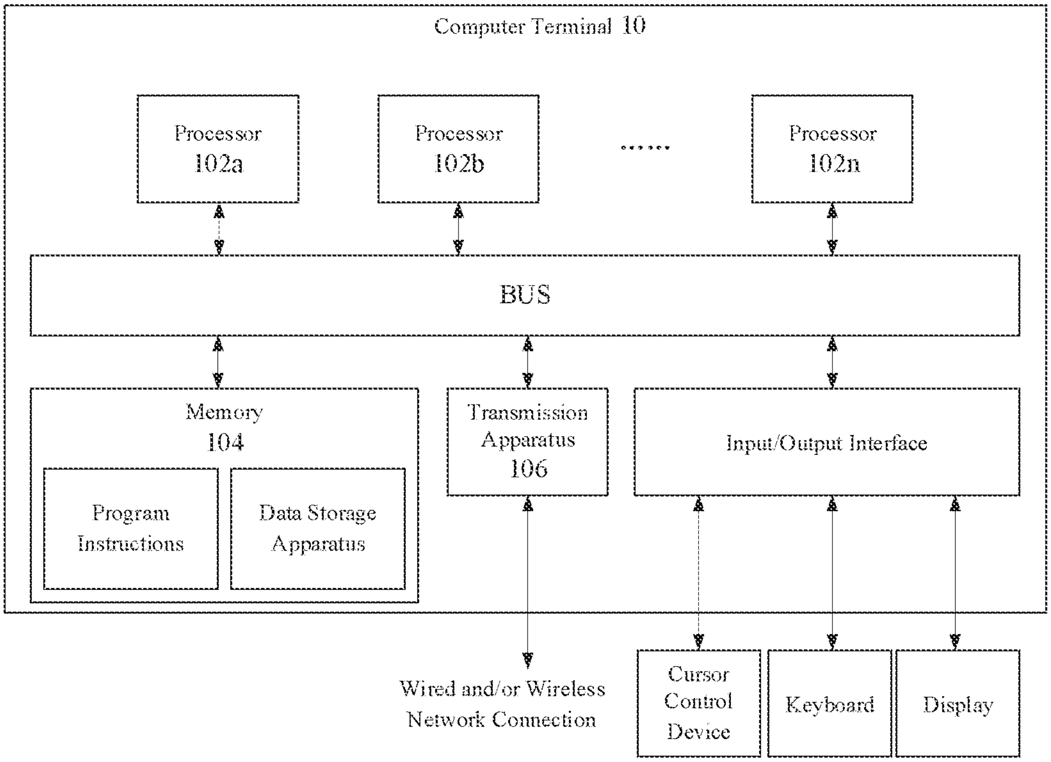
FIG. 1 is a hardware structural block diagram of a computer terminal (or a mobile device) used to implement a data processing method according to an embodiment of the present application.

In order to enable those skilled in the art to better understand the solution of the present application, the technical solutions of the embodiments of the present application will be described clearly and completely below with reference to the drawings corresponding to the embodiments of the present application. Obviously, the described embodiments are only some of the embodiments of the present application, rather than all embodiments. Based on the embodiments of the present application, all other embodiments obtained by those skilled in the art without any creative labor should fall within the scope of protection of the present application.

It should be explained that terms such as "first", "second", etc. in the description and claims of the present application as well as in the above drawings are used to distinguish similar objects, and not necessarily to describe a particular order or sequence. It should be understood that data used in this way may be exchanged under appropriate circumstances, so that the embodiments of the present application described herein may be implemented in an order other than those illustrated or described herein. In addition, terms such as "comprise" and "have", as well as any variants thereof, are intended to indicate nonexclusive inclusion. For example, processes, methods, systems, products, or devices containing a series of steps or units are not necessarily limited to those steps or units clearly listed, but may include other steps or units which are not clearly listed or are inherent to these processes, methods, products, or devices.

First, some nouns or terms appearing in the process of describing the embodiments of the present application are applicable to the following explanations.

Remote procedure call protocol (abbreviated as RPC) is a protocol where services are requested from a remote computer program through networks, without knowing underlying network technologies.

Direct memory access (abbreviated as DMA) allows hardware apparatuses of different speeds to perform access, without relying on heavy interrupt load on a central processing unit (abbreviated as CPU).

Persistent memory region (abbreviated as PMR), defined under no-volatile memory host controller interface specification (non-volatile memory express, abbreviated as NVMe), provides, for a high-speed serial computer expansion bus standard (peripheral component interconnect express, abbreviated as PCIe) storage device, a method of mapping its internal memory to the system's PCIe address space.

NAND flash is a better storage device than a hard drive, especially in low-capacity applications of no more than 4 GB.

Dynamic random access memory (abbreviated as DRAM) is a system memory that can only hold data for a very short period of time.

Apache Pass (abbreviated as AEP) memory is a new non-volatile memory that can be accessed through a dual-inline-memory-modules (abbreviated as DIMM) interface, which is byte addressable.

First Embodiment

According to the embodiments of the present application, there is provided an embodiment of a data processing method. It should be explained that steps shown in a flow chart in the drawings may be executed in a computer system including such as a set of computer executable instructions. Moreover, although a logical order is shown in the flow chart, the shown or described steps, in some cases, may be executed in a different order than the one shown here.

The method embodiment provided in the First Embodiment of the present application may be executed in a mobile terminal, a computer terminal, or a similar arithmetic apparatus. FIG. 1 is a hardware structural block diagram of a computer terminal (or a mobile device) used to implement a data processing method according to an embodiment of the present application. As shown in FIG. 1, computer terminal 10 (or mobile device 10) may comprise one or more (shown as 102*a*, 102*b* . . . 102*n* in the figure) processors 102 (processor 102 may include but is not limited to a microcontroller unit (MCU), or a programmable logic device (FPGA), or other processing apparatuses), a memory 104 for storing data, and a transmission module 106 for implementing communication functions. In addition to these, it may further comprise: a display, an input/output interface (I/O interface), a universal serial bus (USB) port (which may be included as one of ports of the I/O interface), a network interface, a power supply and/or a camera. Those skilled in the art may understand that the structure shown in FIG. 1 is only schematic, and it does not limit the structure of the above electronic apparatus. For example, computer terminal 10 may further comprise more or fewer components than those shown in FIG. 1, or have a different configuration than that shown in FIG. 1.

It should be noted that the above one or more processors 102 and/or other data processing circuits may generally be referred to herein as a "data processing circuit". This data processing circuit may be embodied in whole or in part as software, hardware, firmware or any other combination. In addition, the data processing circuit may be a single independent processing module, or may be wholly or partially integrated into any one of other elements in computer terminal 10 (or mobile device). As mentioned in the embodiments of the present application, this data processing circuit serves as a processor control (e.g., selection of a variable resistor terminal path connected to the interface).

Memory 104 may be used for storing software programs and modules of application software, such as program instructions/data storage apparatuses corresponding to the data processing methods in the embodiments of the present application. Processor 102 runs the software programs and modules stored in memory 104 to execute various functional applications and data processing, namely implementing the above data processing methods. Memory 104 may comprise a high-speed random access memory, and may also comprise a non-volatile memory, such as one or more magnetic storage apparatuses, flash memories, or other non-volatile solid-state memories. In some examples, memory 104 may further comprise a memory located remotely relative to processor 102, and this remote memory may be connected to computer terminal 10 through a network. Examples of the above network include but are not limited to the Internet, an intranet, a local area network, a mobile communication network and a combination thereof.

Transmission apparatus 106 is used for receiving or sending data via a network. Specific examples of the above network may comprise a wireless network provided by a communication provider of computer terminal 10. In an example, transmission apparatus 106 comprises a network interface controller (abbreviated as NIC), which may be connected to other network devices through a base station and thereby may communicate with the Internet. In an example, transmission apparatus 106 may be a radio frequency (abbreviated as RF) module, which is used for communicating with the Internet wirelessly.

The display may be, for example, a touch-screen liquid crystal display (LCD), and this LCD may enable a user to interact with a user interface of computer terminal 10 (or mobile device).

It should be explained here that in some optional embodiments, the computer device (or mobile device) shown in FIG. 1 above may comprise hardware elements (including circuits), software elements (including computer codes stored in a computer-readable medium), or a combination of both hardware elements and software elements. It should be pointed out that FIG. 1 is only an example of a specific, particular embodiment, and is intended to illustrate the types of components that may be present in the above computer device (or mobile device).

Figure 2:
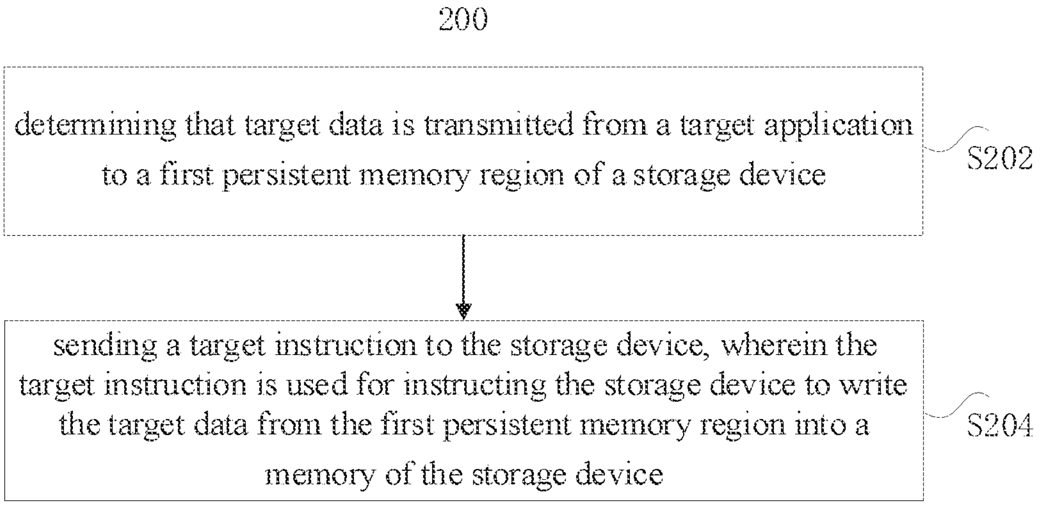
FIG. 2 is a flow chart of a data processing method according to an embodiment of the present application.

FIG. 2 is a flow chart of a data processing method according to an embodiment of the present application. As shown in FIG. 2, this method 200 may be applied to a storage engine, and may comprise the following steps:

At step S202, determining that target data is transmitted from a target application to a first persistent memory region of a storage device.

In the technical solution provided at the above step S202 of the present application, the target data may be data to be written to the storage device, which may be data of the target application, wherein the target application may execute an application.

In some examples, the storage engine of this embodiment may receive a first target request sent by the target application, and this target request may comprise a data write command, such that the storage engine determines that a data writing task needs to be performed. Optionally, the storage engine of this embodiment may receive the above target request sent by the target application through a remote procedure call protocol (abbreviated as RPC), such that this target request may be an RPC request. The remote procedure call protocol is a protocol where services are requested from a remote computer program through networks, without knowing underlying network technologies.

In some examples, the storage engine of this embodiment initiates a second target request, and this second target request may be a direct memory access (abbreviated as DMA) request, for instructing that the target data may be transmitted from the target application to the first persistent memory region (PMR) of the storage device. The DMA allows hardware apparatuses of different speeds to perform access, without relying on heavy interrupt load on a central processing unit (abbreviated as CPU). Optionally, the above storage device may be a Non-Volatile Memory express (abbreviated as NVMe) device.

In this embodiment, the above first persistent memory region is defined under the NVMe, and may provide, for a storage device using peripheral component interconnect express (abbreviated as PCIe), a method of mapping its internal memory to the system's PCIe address space, which may be a storage region with memory-level read and write speed, where data therein will not lost after power outage, and is accessible by the host and other devices.

In this embodiment, after the target data has been transmitted from the target application to the first persistent memory region of the storage device, the storage engine may acquire a notification message sent by a network card, this notification message being used for indicating that the target data has been transmitted from the target application to the first persistent memory region of the storage device, such that the storage engine determines that the target data is transmitted from the target application to the first persistent memory region of the storage device. The network card may be a SmartNIC.

At step S204, sending a target instruction to the storage device, wherein the target instruction is used for instructing the storage device to write the target data from the first persistent memory region into a memory of the storage device.

In the technical solution provided at the above step S204 of the present application, after it is determined that the target data is transmitted from the target application to the first persistent memory region of the storage device, a target instruction may be sent to the storage device, and this target instruction may be a non-volatile memory express (abbreviated as NVMe) command, and may be used for instructing to write the above target data from the first persistent memory region of the storage device into the memory of the storage device, and this memory may be an internal memory of the storage device.

In this embodiment, by means of the target instruction, the storage device is instructed to write the target data from the first persistent memory region into the memory of the storage device. Since the target data is stored in the internal memory of the storage device, no additional PCIe traffic is needed. In this way, it is possible to save PCIe matrix overheads and host memory bandwidth, or save bandwidth for Apache Pass (abbreviated as AEP).

Through the above steps S202 to S204 of the present application, it is determined that the target data is transmitted from the target application to the first persistent memory region of the storage device; and the target instruction is sent to the storage device, wherein the target instruction is used for instructing the storage device to write the target data from the first persistent memory region into the memory of the storage device. That is to say, in the present application, data writing is optimized by using a function of the persistent memory region of the storage device, which may enable the target data to be directly transmitted from the persistent memory region to the memory of the storage device, rather than being first transmitted to a host memory (or AEP), and then forwarded to the storage device, thereby solving the technical problem of low efficiency of data storage, and achieving the technical effect of improving the efficiency of storing data.

The above method of this embodiment will be further introduced below.

As an optional implementation, this method further comprises: determining a second persistent memory region associated with the target data; and writing metadata corresponding to the target data into the second persistent memory region, wherein the metadata is used for describing the target data.

In this embodiment, after determining that the target data is transmitted from the target application to the first persistent memory region of the storage device, a second persistent memory region (root ComplexPMR) associated with the target data may be determined. This second persistent memory region is also defined under the NVMe, and provides, for the storage device using the PCIe, a method of mapping its internal memory to the system's PCIe address space, which may also be a storage region with memory-level read and write speed, where data will not lost after power outage, and is accessible by the host and other devices. Optionally, this second persistent memory region is located at a core position in the entire PCIe architecture, and serves as the top-level connection between an input-output (I/O) hierarchical system and a CPU/memory system.

In some examples, the storage engine of this embodiment writes metadata corresponding to the target data through the second persistent memory region associated with the target data. This metadata may also be referred to as intermediary data or relay data, and is data describing the target data, which may be information describing property of the target data, and is used for supporting functions such as storage location indication, historical data, resource search, file recording, etc. Optionally, the metadata in this embodiment may be an electronic catalog. In order to achieve the purpose of compiling the catalog, the content or characteristics of the data may be described and collected, thereby achieving the purpose of assisting in data retrieval.

As an optional implementation, the writing metadata corresponding to the target data into the second persistent memory region comprises: writing the metadata into the second persistent memory region through a processor, wherein the processor does not cache the metadata.

In this embodiment, when implementing the step of writing metadata corresponding to the target data into the second persistent memory region, the CPU of the storage engine may write the metadata corresponding to the target data through the second persistent memory region associated with the target data. In this embodiment, since writing by the CPU into the PCIe space is not cacheable, and thus the CPU in this embodiment does not cache the metadata, for which, for example, cache line flushing may not be needed, thereby avoiding the need of flushing cache line by the CPU as writing into memory by the CPU is cacheable in related technologies.

As an optional implementation, the writing metadata corresponding to the target data into the second persistent memory region comprises: writing the metadata back to the second persistent memory region.

In this embodiment, when implementing the step of writing metadata corresponding to the target data into the second persistent memory region, a PCIe write transaction may be utilized to write the target data to the second persistent memory region, wherein the PCIe write transaction may be a write back operation.

As an optional implementation, this method further comprises: performing a barrier operation on the second persistent memory region; and the writing the metadata back to the second persistent memory region comprises: writing the metadata back to the second persistent memory region after the barrier operation.

In this embodiment, since the PCIe write transaction is a write back operation, to ensure that the above metadata reaches and is stored in the second persistent memory region (PMR), this embodiment may perform a barrier operation on the second persistent memory region.

As an optional implementation, the performing a barrier operation on the second persistent memory region comprises: performing, based on a target register, the barrier operation on the second persistent memory region.

In this embodiment, when implementing the step of performing a barrier operation on the second persistent memory region, the barrier operation may be performed on the second persistent memory region based on a target register (PMRWBM register). This target register may be a register defined in the second persistent memory region, and used for implementing the barrier operation on the second persistent memory region.

As an optional implementation, this method further comprises: sending a target message to the target application, wherein the target message is used for indicating that the barrier operation on the second persistent memory region has been completed.

In this embodiment, after completing the barrier operation on the second persistent memory region based on the target register, the storage engine may send a target message to the target application. This target message may be an RPC response message used for responding to the target application, enabling the target application to determine that the storage engine has completed the barrier operation performed for the second persistent memory region.

As an optional implementation, this method further comprises: determining that the target data is successfully written into the memory, and then performing a release operation on a buffer resource corresponding to the target data in the first persistent memory region.

In this embodiment, after the target data is successfully written into the storage device, the storage device may send a notification message to the storage engine. This notification message is used for indicating that the storage device successfully writes the target data. For example, if the storage device safely stores the target data, then the buffer resource corresponding to the target data in the first persistent memory region may be released, and this buffer region may be of a PMR resource.

The storage device may provide storage space for the register and guarantee that this storage space is non-volatile. It designates a portion of the controller's internal memory (DRAM or SRAM) and uses a capacitor to flush data to a NAND flash in the event of power outage. Due to limited capacitance, the capacity will not be very large, usually a few MB. The NAND flash is a better storage device than a hard drive, especially in low-capacity applications of no more than 4 GB.

In a related technology, NV-RAM like may support larger capacities and the device will keep flushing data from a PMR to a NAND to synchronize the data. Back-end NAND channel bandwidth will become the bottleneck of PMR DMA bandwidth.

In another related technology, a non-volatile magnetic random access memory (abbreviated as MRAM) (or X3D) may be embedded in a storage device and mapped to a PMR space, but it is not cost-effective compared with using it as dual-inline-memory-modules (abbreviated as DIMMs) that may be accessed faster by the CPU.

In this embodiment, for different scenarios, the storage engine may select different PMRs for implementation, thereby providing flexibility among device costs, use cases, and implementation complexity. Compared with an AEP solution in related technologies, use of the PMR in this embodiment has the following benefits: the storage engine does not involve additional devices, making system device management easier; and it does not occupy system resources since the AEP needs to remove DIMM slots from the system, leaving fewer slots for other components (e.g., DRAM); there is an AEP device in the storage engine, such that the costs are much higher than a capacitor-covered PMR solution, although its size is larger than a capacitor-covered PMR, since the AEP is not larger than a NVMe storage device, it still serves as a cache in the storage engine, and still requires cache flushing, additional data movement is thus needed from the AEP to the storage device, which is regarded as additional data transmission of the NVMe storage device compared with the PMR solution.

An embodiment of the present application further provides another data processing method.

Figure 3:
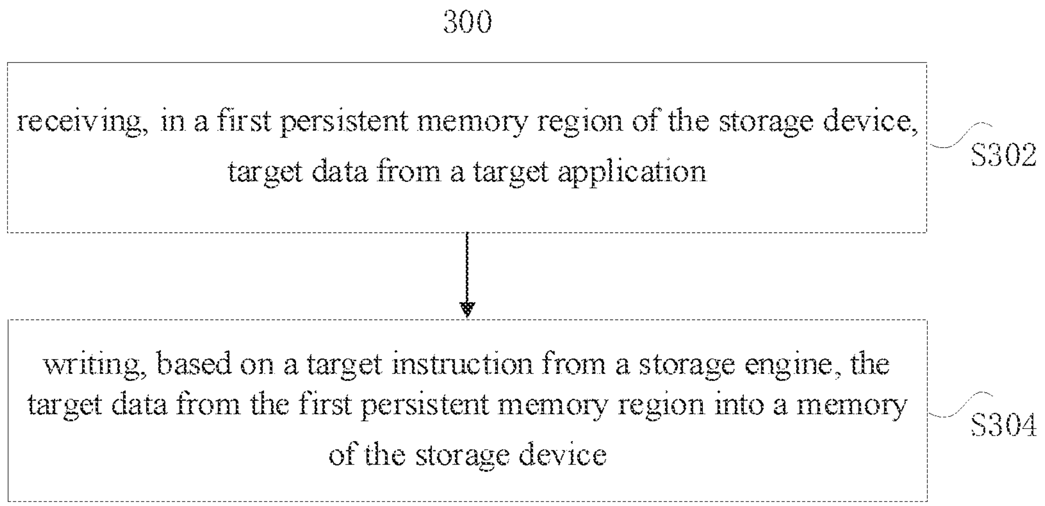
FIG. 3 is a flow chart of a data processing method according to an embodiment of the present application.

FIG. 3 is a flow chart of a data processing method according to an embodiment of the present application. As shown in FIG. 3, this method 300 may be applied to a storage device, and may comprise the following steps:

At step S302, receiving, in a first persistent memory region of the storage device, target data from a target application.

In the technical solution provided at the above step S302 of the present application, the target data may be data to be written into the storage device, which may be data of the target application, wherein the target application may execute an application.

In some examples, a storage engine of this embodiment may receive a first target request sent by the target application, and this target request may comprise a data write command, such that the storage engine determines that a data writing task needs to be performed. Optionally, the storage engine initiates a second target request, and this second target request is used for instructing that the target data may be transmitted from the target application to the first persistent memory region of the storage device, thereby receiving, in the first persistent memory region of the storage device, the target data from the target application.

In this embodiment, after receiving, in the first persistent memory region of the storage device, the target data from the target application, a SmartNIC may send a notification message to the storage engine, this notification message being used for indicating that the target data has been transmitted from the target application to the first persistent memory region of the storage device, such that the storage engine determines that the target data is transmitted from the target application to the first persistent memory region of the storage device.

At step S304, writing, based on a target instruction from a storage engine, the target data from the first persistent memory region into a memory of the storage device.

In the technical solution provided at the above step S304 of the present application, after receiving, in the first persistent memory region of the storage device, the target data from the target application, the target data may be written from the first persistent memory region into the memory of the storage device based on the target instruction from the storage engine.

In this embodiment, this target instruction may be an NVMe command, and may be used for instruct to write the above target data from the first persistent memory region of the storage device into the memory of the storage device. The storage device may write, in response to the above target instruction, the target data from the first persistent memory region into the memory of the storage device.

In this embodiment, the target instruction is used for instructing the storage device to write the target data from the first persistent memory region into the memory of the storage device. Since the target data is stored in an internal memory of the storage device, no additional PCIe traffic is needed. In this way, it is possible to save PCIe matrix overheads and host memory bandwidth, or save bandwidth for AEP.

An embodiment of the present application further provides another data processing method.

Figure 4:
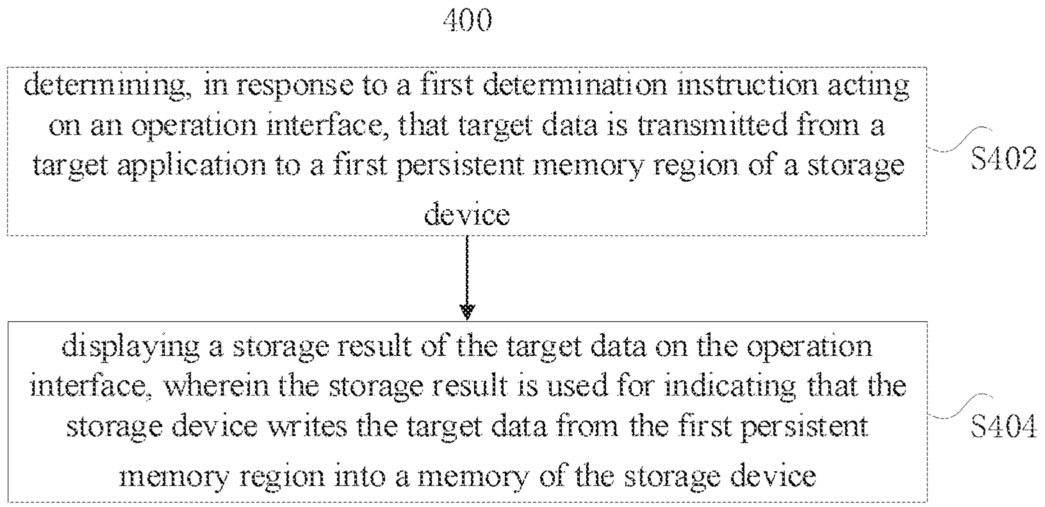
FIG. 4 is a flow chart of a data processing method according to an embodiment of the present application.

FIG. 4 is a flow chart of a data processing method according to an embodiment of the present application. As shown in FIG. 4, this method 400 may be applied to a storage engine, and may comprise the following steps:

At step S402: determining, in response to a first determination instruction acting on an operation interface, that target data is transmitted from a target application to a first persistent memory region of a storage device.

In the technical solution provided at the above step S402 of the present application, a user may trigger the first determination instruction on the operation interface, this first determination instruction being used for determining that the target data is transmitted from the target application to the first persistent memory region of the storage device, and then in response to the first determination instruction, it is determined that the target data is transmitted from the target application to the first persistent memory region of the storage device.

In some examples, a storage engine of this embodiment may receive a first target request sent by the target application, and this target request may comprise a data write command, such that the storage engine determines that a data writing task needs to be performed. Optionally, the storage engine initiates a second target request that is used for instructing that the target data may be transmitted from the target application to the first persistent memory region of the storage device, thereby receiving, in the first persistent memory region of the storage device, the target data from the target application.

In this embodiment, after receiving, in the first persistent memory region of the storage device, the target data from the target application, a SmartNIC may send a notification message to the storage engine, this notification message being used for indicating that the target data has been transmitted from the target application to the first persistent memory region of the storage device, and then in response to the first determination instruction acting on the operation interface, it is determined that the target data is transmitted from the target application to the first persistent memory region of the storage device.

At step S404, displaying a storage result of the target data on the operation interface, wherein the storage result is used for indicating that the storage device writes the target data from the first persistent memory region into a memory of the storage device.

In the technical solution provided at the above step S404 of the present application, after determining, in response to the first determination instruction acting on the operation interface, that the target data is transmitted from the target application to the first persistent memory region of the storage device, the storage result of the target data may be displayed on the operation interface, and this storage result may be a result of writing, based on a target instruction from the storage engine, the target data from the first persistent memory region into the memory of the storage device.

In this embodiment, the target instruction is used for instructing the storage device to write the target data from the first persistent memory region into the memory of the storage device. Since the target data is stored in an internal memory of the storage device, no additional PCIe traffic is needed. In this way, it is possible to save PCIe matrix overheads and host memory bandwidth, or save bandwidth for AEP.

An embodiment of the present application further provides another data processing method.

Figure 5:
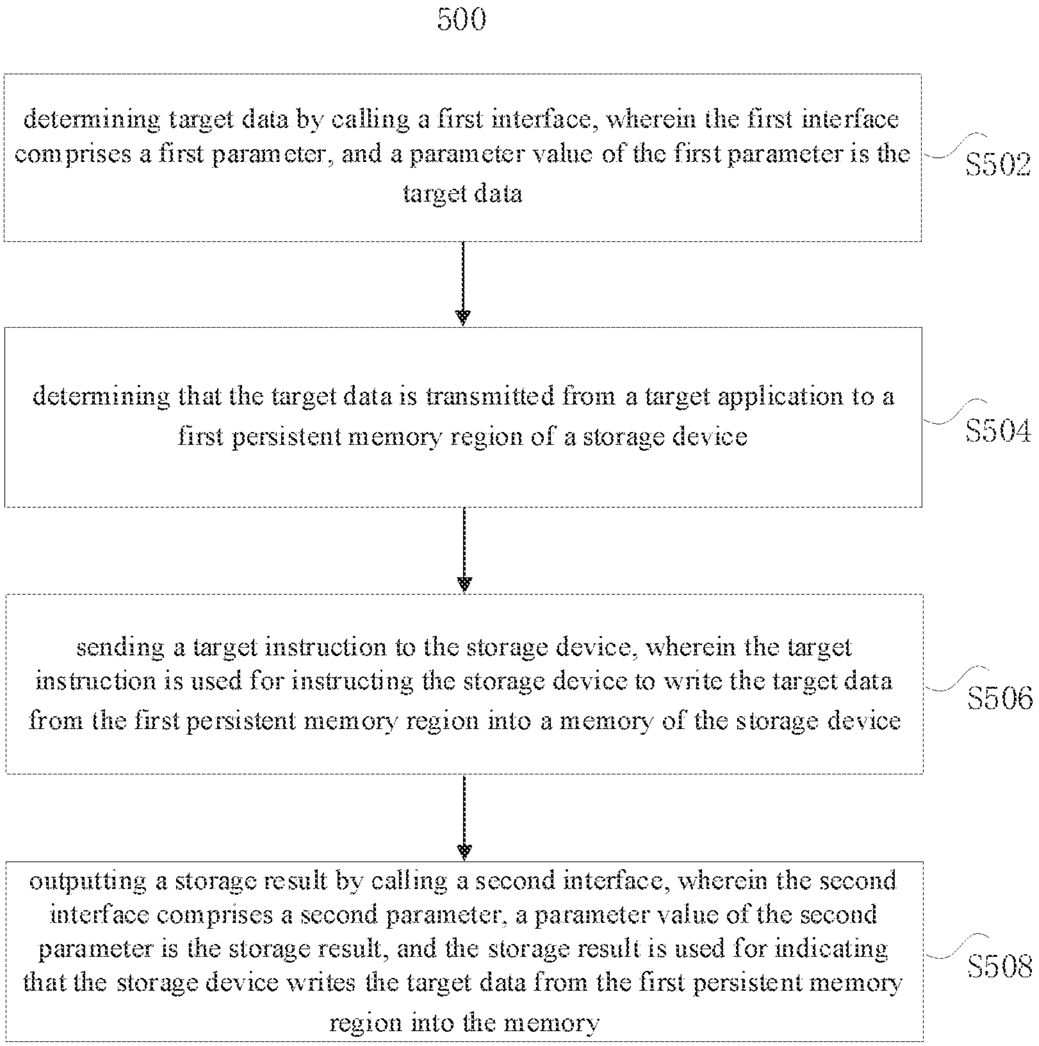
FIG. 5 is a flow chart of a data processing method according to an embodiment of the present application.

FIG. 5 is a flow chart of a data processing method according to an embodiment of the present application. As shown in FIG. 5, this method 500 may be applied to a storage engine, and may comprise the following steps:

At step S502, determining target data by calling a first interface, wherein the first interface comprises a first parameter, and a parameter value of the first parameter is the target data.

In the technical solution provided at the above step S502 of the present application, the first interface may be an interface for data interaction between the storage engine and a client. The client may pass the target data into the first interface as a first parameter of the first interface to achieve the purpose of determining the target data by the storage engine.

At step S504, determining that the target data is transmitted from a target application to a first persistent memory region of a storage device.

At step S506, sending a target instruction to the storage device, wherein the target instruction is used for instructing the storage device to write the target data from the first persistent memory region into a memory of the storage device.

At step S508, outputting a storage result by calling a second interface, wherein the second interface comprises a second parameter, a parameter value of the second parameter is the storage result, and the storage result is used for indicating that the storage device writes the target data from the first persistent memory region into the memory.

In the technical solution provided at the above step S508 of the present application, the second interface may be an interface for data interaction between the storage engine and the client, and the storage engine may pass the storage result into the second interface as a parameter of the second interface to achieve the purpose of delivering the storage result to the client.

In these embodiments, data writing is optimized by using a function of the persistent memory region of the storage device, which may enable the target data to be directly transmitted from the persistent memory region to the memory of the storage device, rather than being first transmitted to a host memory (or AEP), and then forwarded to the storage device. Additionally, in these embodiments, by using PMR characteristics, it is not necessary to deploy other components in the storage engine, for example, an AEP or NV-RAM is not required (and these components bring complexity and high costs to quality of service optimization), thereby solving the technical problem of low efficiency of data storage, and achieving the technical effect of improving the efficiency of storing data.

Second Embodiment

Other implementations of the above methods in the embodiments will be further introduced below.

QoS is becoming increasingly important in the storage industry. In a storage engine, an NVMe device may be deployed as a storage device. Since the NVMe storage device is a block device, data needs to be transmitted in logical blocks as a unit, which may be 4096 bytes in size. Prior to responding to user operations, the storage engine needs to wait for a confirmation write command from the NVMe storage device. The NVMe protocol stack typically needs 8 to 12 microseconds, which is a significant loss for the QoS, especially at low queue depths.

In a related technology, there is an Intel AEP solution. In this solution, memory may provide GB-level non-volatile memory (NVM) data caching. This solution occupies system resources like a DIMM slot and brings additional work in managing devices (e.g., data synchronization, device management, etc.), and the cost is relatively high.

In another related technology, there is an NV-RAM solution. In this solution, a DRAM is combined with a NAND flash subsystem to periodically synchronize data. This also needs a large capacitor to ensure that data may be flushed to the NAND flash in the event of power outage. The size of this solution is also at a GB level, which will occupy a DIMM slot and need additional effort to manage new devices. The costs are very high due to the high costs of DRAM+NAND+ capacitor.

In another related technology, there is an NV-RAM like solution. This solution may support larger capacities, and a device will keep flushing data from a PMR to a NAND to synchronize the data. Back-end NAND channel bandwidth will become the bottleneck of PMR DMA bandwidth.

In another related technology, an MRAM may be embedded in an NVMe device and mapped to a PMR space, which is not cost-effective compared with a DIMM that may be accessed faster by the CPU.

Figure 6:
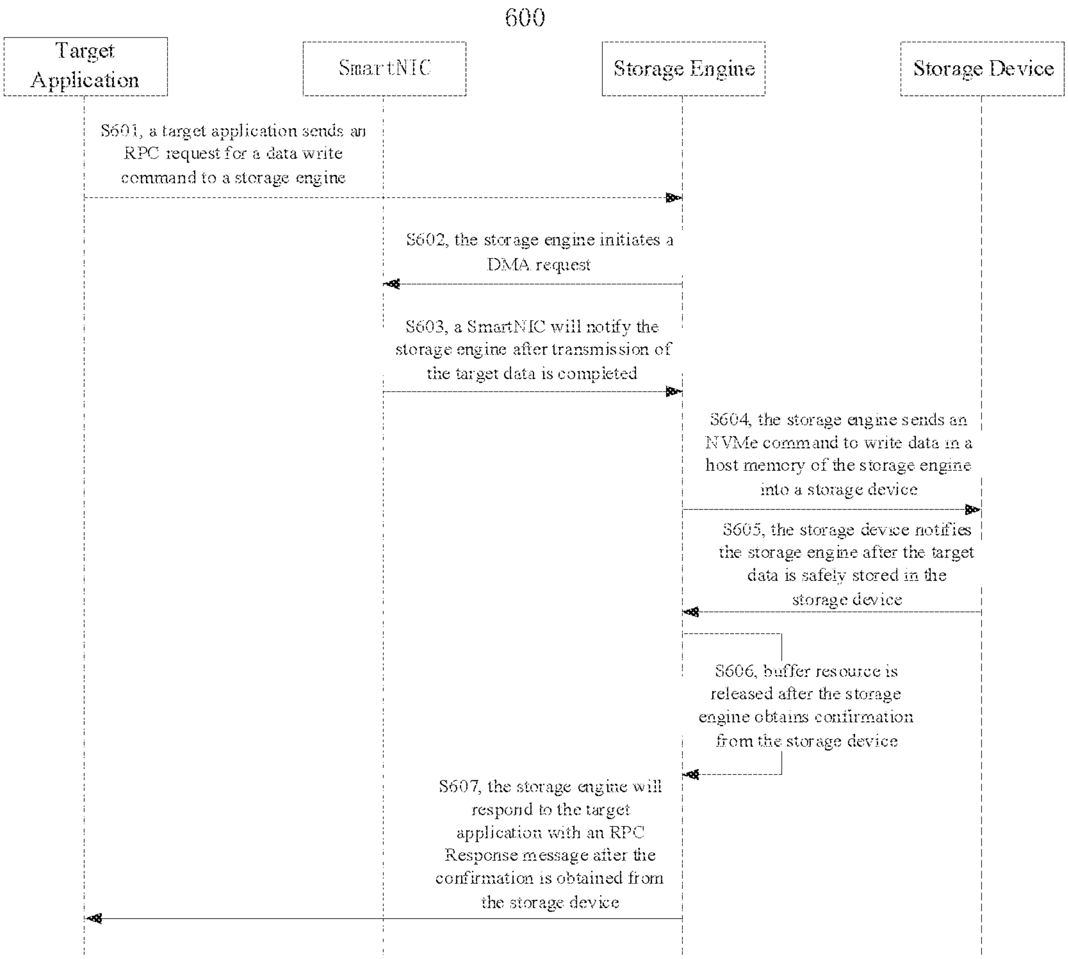
FIG. 6 is a flow chart of a data writing method according to a related technology.

FIG. 6 is a flow chart of a data writing method according to a related technology. As shown in FIG. 6, this method 600 may comprise the following steps:

At step S601, a target application sends an RPC request for a data write command to a storage engine.

At step S602, the storage engine initiates a DMA request.

The storage engine initiates the DMA request to transmit target data from the target application to DMA of the storage engine.

At step S603, a SmartNIC will notify the storage engine after transmission of the target data is completed.

At step S604, the storage engine sends an NVMe command to write data in a host memory of the storage engine into a storage device.

At step S605, the storage device notifies the storage engine after the target data is safely stored in the storage device.

At step S606, buffer resource is released after the storage engine obtains confirmation from the storage device.

At step S607, the storage engine will respond to the target application with an RPC Response message after the confirmation is obtained from the storage device.

In a write data path of the storage engine, main latency occurs on the storage device, which usually needs 8 to 12 microseconds from sending an NVMe command to obtaining an NVMe response.

In order to save the main latency costs of the storage device, an AEP storage device with a memory interface may be employed. Compared with the NVMe storage device, which is a block device, the AEP has byte-addressable characteristics and may have higher flexibility and lower latency costs during data access.

Figure 7:
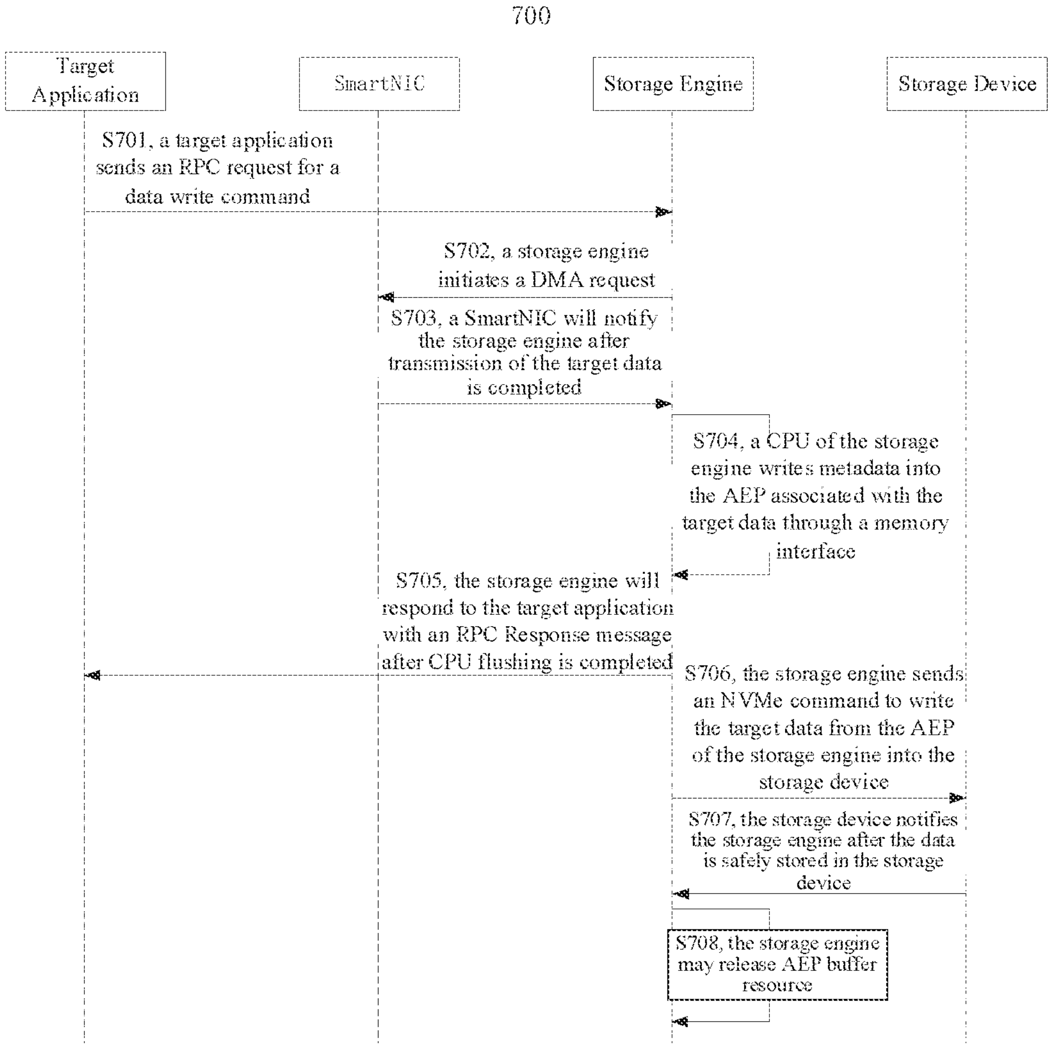
FIG. 7 is a flow chart of another data writing method according to a related technology.

FIG. 7 is a flow chart of another data writing method in a related technology. As shown in FIG. 7, this method 700 may comprise the following steps:

At step S701, a target application sends an RPC request for a data write command.

At step S702, a storage engine initiates a DMA request to transmit target data from the target application to an AEP of the storage engine.

At step S703, a SmartNIC will notify the storage engine after transmission of the target data is completed.

At step S704, a CPU of the storage engine writes metadata into the AEP associated with the target data through a memory interface.

Since writing by CPU into memory is cacheable, the CPU needs to flush cache line to ensure that the metadata is synchronized to the AEP device.

At step S705, the storage engine will respond to the target application with an RPC Response message after CPU flushing is completed.

At step S706, the storage engine sends an NVMe command to write the target data from the AEP of the storage engine into the storage device.

At step S707, the storage device notifies the storage engine after the data is safely stored in the storage device.

At step S708, the storage engine may release AEP buffer resource.

Obviously, after the target data is transmitted to the AEP and the metadata is synchronized to the AEP, the write request of the target application may be confirmed immediately.

An Intel AEP DIMM Optane memory may provide GB-level NVM data caching. However, it occupies system resources, such as memory slots, and brings additional management in devices (e.g., data synchronization, device management, etc.). Moreover, the costs are relatively high. Additionally, flushing CPU caches will have significant side effects on other tasks.

The embodiments propose a new solution, in which the QoS of a storage engine may be optimized by using a persistent memory region (PMR), and write latency is optimized by using a function of a NVMe PMR, which may be used for protecting an Internet Protocol (abbreviated as IP) recorded and sorted in Pangu.

The PMR function of this embodiment may provide, for a NVMe storage device, a method of mapping its internal memory to a PCIe matrix, such that data may be transmitted directly from the SmartNIC to the NVMe storage device, rather than being first transmitted to a host memory (or AEP), and then forwarded to the storage device.

Figure 8:
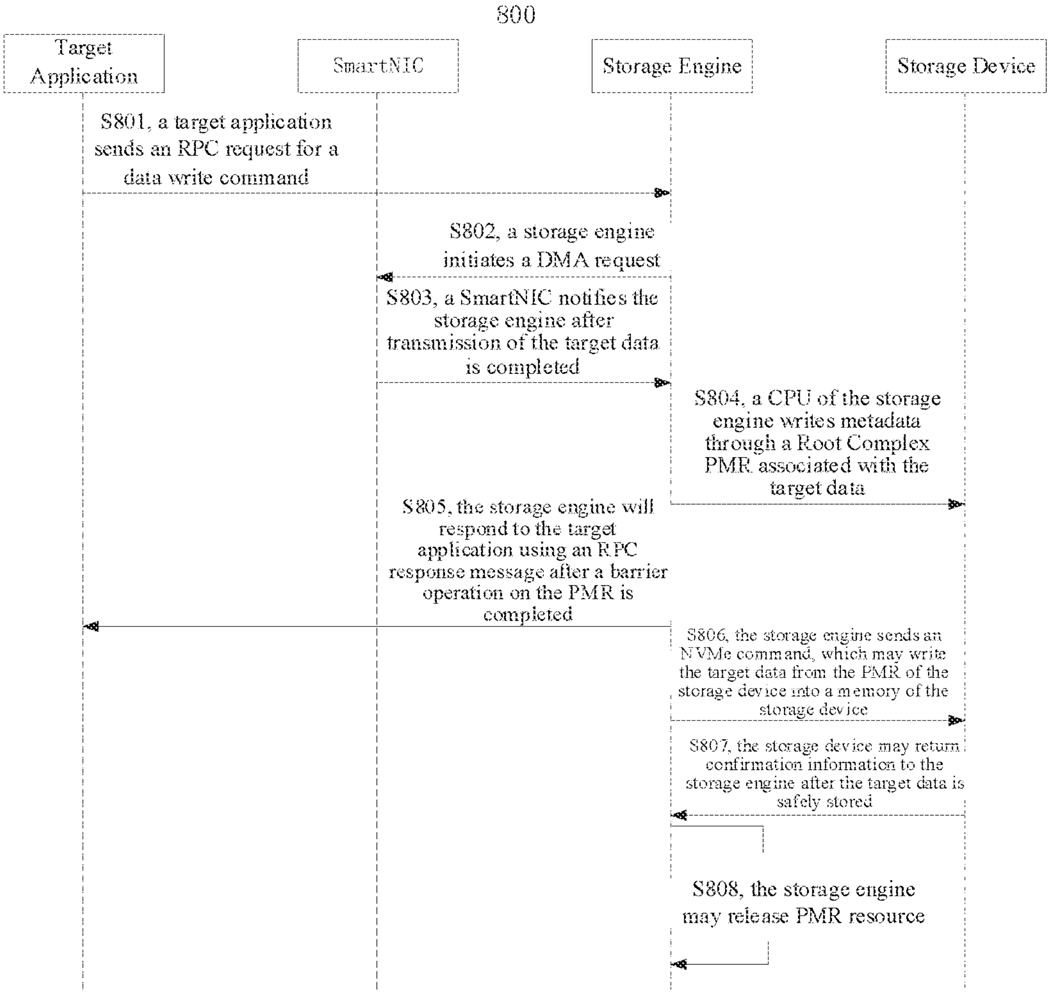
FIG. 8 is a flow chart of a data writing method according to an embodiment of the present application.

FIG. 8 is a flow chart of a data writing method according to an embodiment of the present application. As shown in FIG. 8, this method 800 may comprise the following steps:

At step S801, a target application sends an RPC request for a data write command.

At step S802, a storage engine initiates a DMA request to transmit target data from the target application to a PMR of a storage device.

At step S803, a SmartNIC notifies the storage engine after transmission of the target data is completed.

At step S804, a CPU of the storage engine writes metadata through a Root Complex PMR associated with the target data.

In this embodiment, since the writing by CPU to the PCIe BAR space may be non-cacheable, the CPU does not need to perform cache line flushing. Since a PCIe write transaction is a write back operation, in order to ensure that the metadata reaches the PMR, a barrier operation needs to be performed on the PMR, and the PMR defines a PMR WBM register to provide such function.

At step S805, the storage engine will respond to the target application with an RPC response message after a barrier operation on the PMR is completed.

At step S806, the storage engine sends an NVMe command, which may write the target data from the PMR of the storage device into a memory of the storage device.

In this embodiment, since the target data is in an internal memory of the storage device, no additional PCIe traffic is needed, which will save PCIe matrix overheads and host memory bandwidth (or AEP bandwidth).

At step S807, the storage device may return confirmation information to the storage engine after the target data is safely stored.

At step S808, the storage engine may release PMR resource.

In this embodiment, the NVMe device may provide storage space from a BAR register and guarantee that this storage space is non-volatile. For capacitor protection, this embodiment may designate a portion of the controller's internal memory (DRAM or SRAM), and use a capacitor to flush data to a NAND flash in the event of power outage. Due to limited capacitance, the capacity will not be very large, usually a few MB.

For the NV-RAM like, larger capacities may be supported. The device will keep flushing data from a PMR to a NAND to synchronize the data, and back-end NAND channel bandwidth will become the bottleneck of PMR DMA bandwidth.

Another implementation is to embed an MRAM (or X3D) into the NVMe device and map it to a PMR space, but this is not cost-effective compared with a DIMM that may be accessed faster by the CPU.

In this embodiment, for different scenarios, the storage engine may select different PMRs for implementation, thereby providing flexibility among device costs, use cases, and implementation complexity.

Compared with an AEP solution in related technologies, use of the PMR has the following benefits: the storage engine does not involve additional devices, making system device management easier; and it does not occupy system resources since the AEP needs to remove DIMM slots from the system, leaving fewer slots for other components (e.g., DRAM); there is an AEP device in the storage engine, such that the costs are much higher than a capacitor-covered PMR solution, although its size is larger than a capacitor-covered PMR, since the AEP is not larger than a NVMe storage device, it still serves as a cache in the storage engine, and still requires cache flushing, additional data movement is thus needed from the AEP to the storage device, which is regarded as additional data transmission of the NVMe storage device compared with the PMR solution.

In these embodiments, data writing is optimized by using a function of the persistent memory region of the storage device, which may enable the target data to be directly transmitted from the persistent memory region to the memory of the storage device, rather than being first transmitted to a host memory (or AEP), and then forwarded to the storage device. Additionally, in these embodiments, by using PMR characteristics, it is not necessary to deploy other components in the storage engine, for example, an AEP or NV-RAM is not required (and these components bring complexity and high costs to quality of service optimization), thereby solving the technical problem of low efficiency of data storage, and achieving the technical effect of improving the efficiency of storing data.

It should be explained that, for the above various method embodiments, for the sake of simple description, they are expressed as a combination of a series of actions. However, those skilled in the art should know that the present application is not limited by the described action orders, because pursuant to the present application, some steps may be performed in other orders or simultaneously. Secondly, those skilled in the art should also know that the embodiments described in the specification are schematic embodiments, and the actions and modules involved are not necessary for the present application.

Through the description of the above implementations, those skilled in the art may clearly understand that the methods according to the above embodiments may be implemented by means of software plus a necessary general-purpose hardware platform. Of course, they may also be implemented by hardware. In many cases, the former is a better implementation. Based on such understanding, the essence of the technical solution of the present application or the part that makes a contribution over the prior art may be embodied in the form of a software product, and this computer software product is stored in a storage medium (e.g., a ROM/RAM, a diskette, an optical disk), and contains several instructions to enable a terminal device (which may be a mobile phone, a computer, a server, a network device, etc.) to execute the methods described in various embodiments of the present application.

Third Embodiment

According to an embodiment of the present application, there is further provided a data processing apparatus for implementing the data processing method 200 shown above in FIG. 2.

Figure 9:
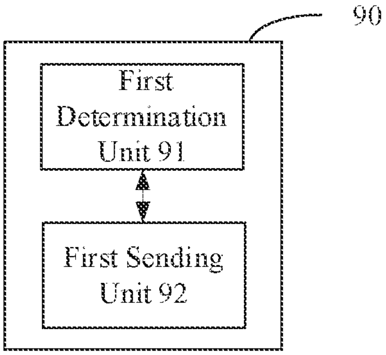
FIG. 9 is a schematic diagram of a data processing apparatus according to an embodiment of the present application.

FIG. 9 is a schematic diagram of a data processing apparatus according to an embodiment of the present application. As shown in FIG. 9, this data processing apparatus 90 may be applied to a storage engine, and may comprise: a first determination unit 91 and a first sending unit 92.

First determination unit 91 is used for determining that target data is transmitted from a target application to a first persistent memory region of a storage device.

First sending unit 92 is used for sending a target instruction to the storage device, wherein the target instruction is used for instructing the storage device to write the target data from the first persistent memory region into a memory of the storage device.

It should be explained here that the above first determination unit 91 and first sending unit 92 correspond to the steps S202 to S204 in the First Embodiment. Instances and application scenarios implemented by the two units are the same as those of the corresponding steps, but they are not limited to the content disclosed in the above First Embodiment. It should be explained that the above units, as part of the apparatus, may run in computer terminal 10 provided in the First Embodiment.

According to an embodiment of the present application, there is further provided a data processing apparatus for implementing the data processing method shown above in FIG. 3.

Figure 10:
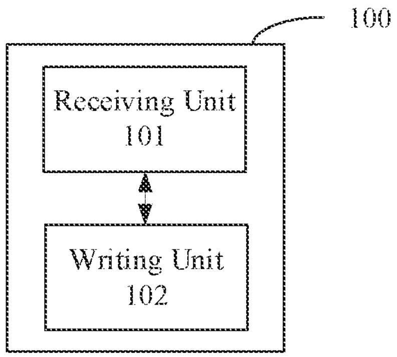
FIG. 10 is a schematic diagram of another data processing apparatus according to an embodiment of the present application.

FIG. 10 is a schematic diagram of another data processing apparatus according to an embodiment of the present application. As shown in FIG. 10, this data processing apparatus 100 may be applied to a storage device, and may comprise: a receiving unit 101 and a writing unit 102.

Receiving unit 101 is used for receiving, in a first persistent memory region of the storage device, target data from a target application.

Writing unit 102 is used for writing, based on a target instruction from a storage engine, the target data from the first persistent memory region into a memory of the storage device.

It should be explained here that the above receiving unit 101 and writing unit 102 correspond to the steps S302 to S304 in the First Embodiment. Instances and application scenarios implemented by the two units are the same as those of the corresponding steps, but they are not limited to the content disclosed in the above First Embodiment. It should be explained that the above units, as part of the apparatus, may run in computer terminal 10 provided in the First Embodiment.

According to an embodiment of the present application, there is further provided a data processing apparatus for implementing the data processing method 400 shown above in FIG. 4.

Figure 11:
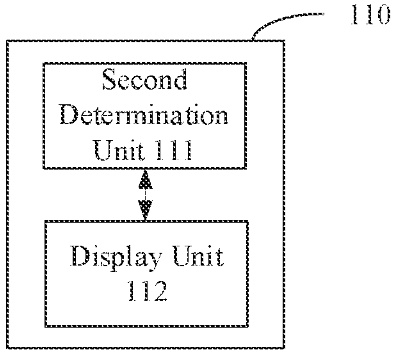
FIG. 11 is a schematic diagram of another data processing apparatus according to an embodiment of the present application.

FIG. 11 is a schematic diagram of another data processing apparatus according to an embodiment of the present application. As shown in FIG. 11, this data processing apparatus 110 may be applied to a storage device, and may comprise: a second determination unit 111 and a display unit 112.

Second determination unit 111 is used for determining, in response to a first determination instruction acting on an operation interface, that target data is transmitted from a target application to a first persistent memory region of a storage device.

Display unit 112 is used for displaying a storage result of the target data on the operation interface, wherein the storage result is used for indicating that the storage device writes the target data from the first persistent memory region into a memory of the storage device.

It should be explained here that the above second determination unit 111 and display unit 112 correspond to the steps S402 to S404 in the First Embodiment. Instances and application scenarios implemented by the two units are the same as those of the corresponding steps, but they are not limited to the content disclosed in the above First Embodiment. It should be explained that the above units, as part of the apparatus, may run in computer terminal 10 provided in the First Embodiment.

According to an embodiment of the present application, there is further provided a data processing apparatus for implementing the data processing method 500 shown above in FIG. 5.

Figure 12:
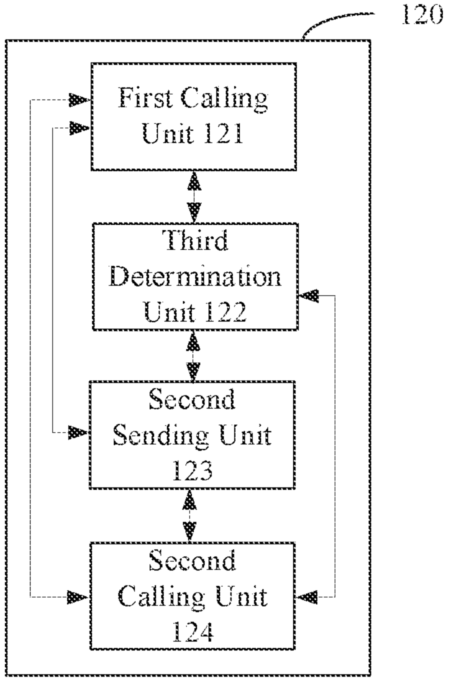
FIG. 12 is a schematic diagram of another data processing apparatus according to an embodiment of the present application.

FIG. 12 is a schematic diagram of another data processing apparatus according to an embodiment of the present application. As shown in FIG. 12, this data processing apparatus 120 may be applied to a storage device, and may comprise: a first calling unit 121, a third determination unit 122, a second sending unit 123 and a second calling unit 124.

First calling unit 121 is used for determining target data by calling a first interface, wherein the first interface comprises a first parameter, and a parameter value of the first parameter is the target data.

Third determination unit 122 is used for determining that the target data is transmitted from a target application to a first persistent memory region of a storage device.

Second sending unit 123 is used for sending a target instruction to the storage device, wherein the target instruction is used for instructing the storage device to write the target data from the first persistent memory region into a memory of the storage device.

Second calling unit 124 is used for outputting a storage result by calling a second interface, wherein the second interface comprises a second parameter, a parameter value of the second parameter is the storage result, and the storage result is used for indicating that the storage device writes the target data from the first persistent memory region into the memory.

It should be explained here that the above first calling unit 121, third determination unit 122, second sending unit 123 and second calling unit 124 correspond to the steps S502 to S508 in the First Embodiment. Instances and application scenarios implemented by the four units are the same as those of the corresponding steps, but they are not limited to the content disclosed in the above First Embodiment. It should be explained that the above units, as part of the apparatus, may run in computer terminal 10 provided in the First Embodiment.

In the data processing apparatuses of these embodiments, data writing is optimized by using a function of the persistent memory region of the storage device, which may enable the target data to be directly transmitted from the persistent memory region to the memory of the storage device, rather than being first transmitted to a host memory (or AEP), and then forwarded to the storage device, thereby solving the technical problem of low efficiency of data storage, and achieving the technical effect of improving the efficiency of storing data.

Fourth Embodiment

An embodiment of the present application may provide a data processing system. This data processing system may comprise a computer terminal that may be any computer terminal device in a group of computer terminals. Exemplarily, in this embodiment, the above computer terminal may also be replaced with a mobile terminal or other terminal devices.

In some examples, in this embodiment, the above computer terminal may be located in at least one of a plurality of network devices in a computer network.

In this embodiment, the above computer terminal may execute program codes for the following steps in a data processing method: determining that target data is transmitted from a target application to a first persistent memory region of a storage device; and sending a target instruction to the storage device, wherein the target instruction is used for instructing the storage device to write the target data from the first persistent memory region into a memory of the storage device.

Figure 13:
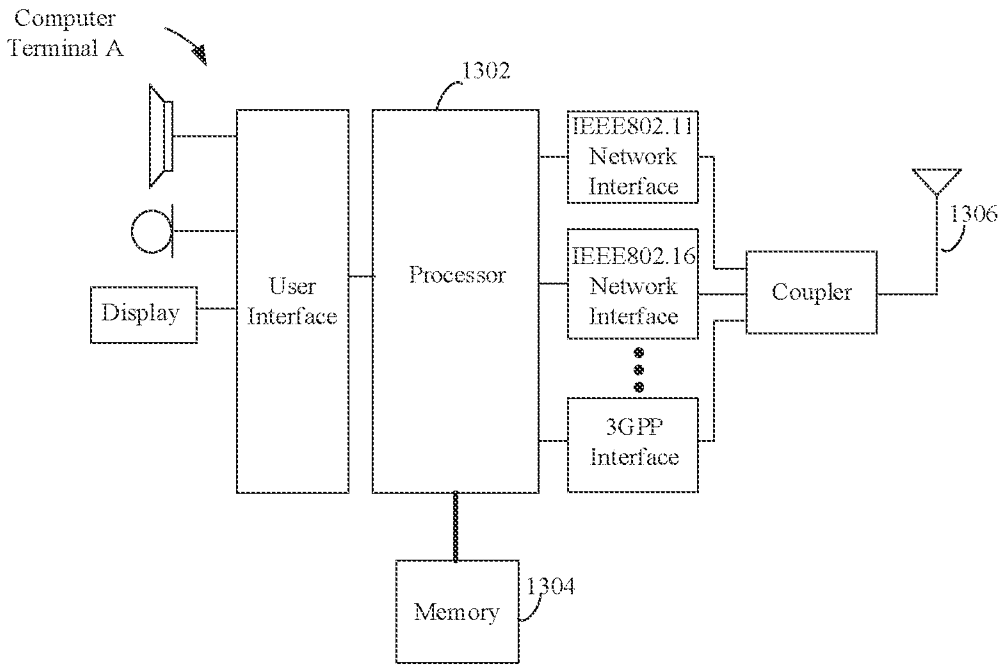
FIG. 13 is a structural block diagram of a computer terminal according to an embodiment of the present application.

In some examples, FIG. 13 is a structural block diagram of a computer terminal according to an embodiment of the present application. As shown in FIG. 13, this computer terminal A may comprise: one or more processors 1302, one or more memories 1304, and one or more transmission apparatuses 1306, with only one shown in the figure.

Memory 1304 may be used for storing software programs and modules, such as program instructions/modules corresponding to the data processing methods and apparatuses in the embodiments of the present application. Processor 1302 runs the software programs and modules stored in the memory to execute various functional applications and data processing, namely implementing the above data processing methods. The memory may comprise a high-speed random access memory, and may also comprise a non-volatile memory, such as one or more magnetic storage apparatuses, flash memories, or other non-volatile solid-state memories. In some examples, the memory may further comprise a memory located remotely relative to the processor, and this remote memory may be connected to computer terminal A through a network. Examples of the above network include but are not limited to the Internet, an intranet, a local area network, a mobile communication network and a combination thereof.

The processor may call information and applications stored in the memory through the transmission apparatus to execute the following steps: determining that target data is transmitted from a target application to a first persistent memory region of a storage device; and sending a target instruction to the storage device, wherein the target instruction is used for instructing the storage device to write the target data from the first persistent memory region into a memory of the storage device.

In some implementations, the above processor may also execute program codes for the following steps: determining a second persistent memory region associated with the target data; and writing metadata corresponding to the target data into the second persistent memory region, wherein the metadata is used for describing the target data.

In some implementations, the above processor may also execute program codes for the following step: writing the metadata into the second persistent memory region through a processor, wherein the processor does not cache the metadata.

In some implementations, the above processor may also execute program codes for the following step: writing the metadata back to the second persistent memory region.

In some implementations, the above processor may also execute program codes for the following steps: performing a barrier operation on the second persistent memory region; and writing the metadata back to the second persistent memory region after the barrier operation.

In some implementations, the above processor may also execute program codes for the following step: performing, based on a target register, the barrier operation on the second persistent memory region.

In some implementations, the above processor may also execute program codes for the following step: sending a target message to the target application, wherein the target message is used for indicating that the barrier operation on the second persistent memory region has been completed.

In some implementations, the above processor may also execute program codes for the following steps: determining that the target data is successfully written into the memory, and then performing a release operation on a buffer resource corresponding to the target data in the first persistent memory region.

As an optional example, the processor may call information and applications stored in the memory through the transmission apparatus to perform the following steps: receiving, in a first persistent memory region of a storage device, target data from a target application; and writing, based on a target instruction from a storage engine, the target data from the first persistent memory region into a memory of the storage device.

As another optional example, the processor may call information and applications stored in the memory through the transmission apparatus to perform the following steps: determining, in response to a first determination instruction acting on an operation interface, that target data is transmitted from a target application to a first persistent memory region of a storage device; and displaying a storage result of the target data on the operation interface, wherein the storage result is used for indicating that the storage device writes the target data from the first persistent memory region into a memory of the storage device.

As another optional example, the processor may call information and applications stored in the memory through the transmission apparatus to perform the following steps: determining target data by calling a first interface, wherein the first interface comprises a first parameter, and a parameter value of the first parameter is the target data; determining that the target data is transmitted from a target application to a first persistent memory region of a storage device; sending a target instruction to the storage device, wherein the target instruction is used for instructing the storage device to write the target data from the first persistent memory region into a memory of the storage device; and outputting a storage result by calling a second interface, wherein the second interface comprises a second parameter, a parameter value of the second parameter is the storage result, and the storage result is used for indicating that the storage device writes the target data from the first persistent memory region into the memory.

In the embodiments of the present application, there is provided a data processing method. It is determined that the target data is transmitted from the target application to the first persistent memory region of the storage device; and the target instruction is sent to the storage device, wherein the target instruction is used for instructing the storage device to write the target data from the first persistent memory region into the memory of the storage device. That is to say, in the present application, data writing is optimized by using a function of the persistent memory region of the storage device, which may enable the target data to be directly transmitted from the persistent memory region to the memory of the storage device, rather than being first transmitted to a host memory (or AEP), and then forwarded to the storage device, thereby solving the technical problem of low efficiency of data storage, and achieving the technical effect of improving the efficiency of storing data.

Those of ordinary skills in the art may understand that the structure shown in FIG. 13 is only schematic, and the computer terminal may also be a smart phone (e.g., an Android phone, an iOS phone, etc.), a tablet computer, a palm computer, and a mobile internet device (MID), a PAD and other terminal devices. FIG. 13 does not limit the structure of the above computer terminal. For example, computer terminal 13 may also include more or fewer components than those shown in FIG. 13 (e.g., a network interface, a display device, etc.), or have a configuration different from that shown in FIG. 13.

Those of ordinary skills in the art may understand that all or part of the steps in the various methods of the above embodiments may be completed by instructing the hardware related to the terminal device through a program. This program may be stored in a computer-readable storage medium, and the storage medium may include: a flash disk, a read-only memory (ROM), a random access memory (RAM), a magnetic disk or an optical disk, and the like.

Fifth Embodiment

An embodiment of the present application further provides a computer-readable storage medium. Optionally, in this embodiment, the above computer-readable storage medium may be used for storing program codes executed for implementing the data processing methods provided in the above First Embodiment.

In some implementations, in this embodiment, the above computer-readable storage medium may be located in any computer terminal in a group of computer terminals in a computer network, or in any mobile terminal in a group of mobile terminals.

In some implementations, in this embodiment, the computer-readable storage medium is set to store program codes for executing the following steps: determining that target data is transmitted from a target application to a first persistent memory region of a storage device; and sending a target instruction to the storage device, wherein the target instruction is used for instructing the storage device to write the target data from the first persistent memory region into a memory of the storage device.

In some implementations, the computer-readable storage medium is also set to store program codes for executing the following steps: determining a second persistent memory region associated with the target data; and writing metadata corresponding to the target data into the second persistent memory region, wherein the metadata is used for describing the target data.

In some implementations, the computer-readable storage medium is also set to store program codes for executing the following steps: writing the metadata into the second persistent memory region through a processor, wherein the processor does not cache the metadata.

In some implementations, the computer-readable storage medium is also set to store program codes for executing the following steps: writing the metadata back to the second persistent memory region.

In some implementations, the computer-readable storage medium is also set to store program codes for executing the following steps: performing a barrier operation on the second persistent memory region; and writing the metadata back to the second persistent memory region after the barrier operation.

In some implementations, the computer-readable storage medium is also set to store program codes for executing the following steps: performing, based on a target register, the barrier operation on the second persistent memory region.

In some implementations, the computer-readable storage medium is also set to store program codes for executing the following steps: sending a target message to the target application, wherein the target message is used for indicating that the barrier operation on the second persistent memory region has been completed.

In some implementations, the computer-readable storage medium is also set to store program codes for executing the following steps: determining that the target data is successfully written into the memory, and then performing a release operation on a buffer resource corresponding to the target data in the first persistent memory region.

As an optional example, the computer-readable storage medium is set to store program codes for executing the following steps: receiving, in a first persistent memory region of a storage device, target data from a target application; and writing, based on a target instruction from a storage engine, the target data from the first persistent memory region into a memory of the storage device.

As another optional example, the computer-readable storage medium is set to store program codes for executing the following steps: determining, in response to a first determination instruction acting on an operation interface, that target data is transmitted from a target application to a first persistent memory region of a storage device; and displaying a storage result of the target data on the operation interface, wherein the storage result is used for indicating that the storage device writes the target data from the first persistent memory region into a memory of the storage device.

As another optional example, the computer-readable storage medium is set to store program codes for executing the following steps: determining target data by calling a first interface, wherein the first interface comprises a first parameter, and a parameter value of the first parameter is the target data; determining that the target data is transmitted from a target application to a first persistent memory region of a storage device; sending a target instruction to the storage device, wherein the target instruction is used for instructing the storage device to write the target data from the first persistent memory region into a memory of the storage device; and outputting a storage result by calling a second interface, wherein the second interface comprises a second parameter, a parameter value of the second parameter is the storage result, and the storage result is used for indicating that the storage device writes the target data from the first persistent memory region into the memory.

The serial numbers of the above embodiments of the present application are only for description, and do not represent the strengths and weaknesses of the embodiments.

In the above embodiments of the present application, the description of each embodiment has its own emphases. A portion that is not described in detail in a certain embodiment may be referred to the relevant descriptions of other embodiments.

In the several embodiments provided in the present application, it should be understood that the disclosed technical content may be implemented in other ways. The apparatus embodiments described above are only schematic. For example, division of units is only a logical function division, and there may be another division way in actual implementations. For example, multiple units or components may be combined or may be integrated into another system, or some features may be omitted, or not executed. In another point, mutual coupling or direct coupling or communication connection shown or discussed may be implemented through some interfaces, and indirect coupling or communication connection of the units or modules may be implemented electrically or in other forms.

The units described as separate parts may or may not be physically separated. The parts displayed as units may or may not be physical units, that is, they may be located in one place, or may also be distributed to multiple network units. Some or all of the units may be selected according to actual needs, to achieve the purpose of the solutions of the embodiments.

Additionally, the respective functional units in each embodiment of the present application may be integrated in one processing unit, or the respective units may exist separately and physically, or two or more units may be integrated in one unit. The above integrated unit may be realized in the form of hardware or in the form of a software functional unit.

If the integrated unit is realized in the form of a software functional unit, and is sold or used as an independent product, it may be stored in a computer-readable storage medium. Based on this understanding, the essence of the technical solution of the present application, or the part that makes a contribution over the prior art, or all or part of the technical solution may be embodied in the form of a software product. The computer software product is stored in a storage medium, including several instructions to enable a computer device (which may be a personal computer, a server, or a network device, etc.) to perform all or part of the steps of the methods described in various embodiments of the present application. The aforesaid storage medium includes: various media that may store program codes, such as U disk, read-only memory (ROM), random access memory (RAM), mobile hard disk, magnetic disk or optical disk, etc.

Described above are only implementations of the present application. It should be pointed out that for those of ordinary skills in this technical field, several improvements and modifications may also be conducted without departing from the principle of the present application. These improvements and modifications should also fall within the scope of protection of the present application.

What is claimed is:

1. A data processing method, applied to a storage engine, comprising:

determining that target data is transmitted from a target application to a first persistent memory region of a storage device, in response to receiving a target request sent by the target application through a remote procedure call protocol; and sending a target instruction to the storage device, wherein the target instruction is used for instructing the storage device to write the target data from the first persistent memory region into a memory of the storage device;

wherein the method further comprises:

determining a second persistent memory region associated with the target data transmitted to the first persistent memory region; and writing metadata corresponding to the target data into the second persistent memory region through a processor, wherein the metadata is used for describing the target data and the processor does not cache the metadata, and wherein the second persistent memory region serves as a top-level connection between an input-output hierarchical system and a CPU/memory system.

2. The method according to claim 1, wherein the writing the metadata corresponding to the target data into the second persistent memory region comprises:

writing the metadata back to the second persistent memory region.

3. The method according to claim 2, wherein the method further comprises: performing a barrier operation on the second persistent memory region; and the writing the metadata back to the second persistent memory region comprises: writing the metadata back to the second persistent memory region after the barrier operation.

4. The method according to claim 3, wherein the performing the barrier operation on the second persistent memory region comprises:

performing, based on a target register, the barrier operation on the second persistent memory region.

5. The method according to claim 3, wherein the method further comprises:

sending a target message to the target application, wherein the target message is used for indicating that the barrier operation on the second persistent memory region has been completed.

6. The method according to claim 1, wherein the method further comprises:

determining that the target data is successfully written into the memory, and then performing a release operation on a buffer resource corresponding to the target data in the first persistent memory region.

7. The method according to claim 1, further comprising:

determining, in response to a first determination instruction acting on an operation interface, that the target data is transmitted from the target application to the first persistent memory region of the storage device; and displaying a storage result of the target data on the operation interface, wherein the storage result is used for indicating that the storage device writes the target data from the first persistent memory region into the memory of the storage device.

8. A data processing method, applied to a storage engine, comprising:

determining target data by calling a first interface, wherein the first interface comprises a first parameter, and a parameter value of the first parameter is the target data;

determining that the target data is transmitted from a target application to a first persistent memory region of a storage device;

sending a target instruction to the storage device, wherein the target instruction is used for instructing the storage device to write the target data from the first persistent memory region into a memory of the storage device;

outputting a storage result by calling a second interface, wherein the second interface comprises a second parameter, a parameter value of the second parameter is the storage result, and the storage result is used for indicating that the storage device writes the target data from the first persistent memory region into the memory;

determining a second persistent memory region associated with the target data transmitted to the first persistent memory region; and writing metadata corresponding to the target data into the second persistent memory region through a processor, wherein the metadata is used for describing the target data and the processor does not cache the metadata, and wherein the second persistent memory region serves as a top-level connection between an input-output hierarchical system and a CPU/memory system.

9. A non-transitory computer-readable storage medium, wherein the computer-readable storage medium comprises a stored program, and the program, when run by a processor, controls a device where the computer-readable storage medium is located to execute the method of claim 1.

10. A processor, used for running a program, wherein the program, when run, executes the method of claim 1.

11. A data processing system, comprising:

a processor; and a memory, connected to the processor, and used for storing instructions, wherein the processor runs the instructions to perform operations of:

determining that target data is transmitted from a target application to a first persistent memory region of a storage device, in response to receiving a target request sent by the target application through a remote procedure call protocol;

sending a target instruction to the storage device, wherein the target instruction is used for instructing the storage device to write the target data from the first persistent memory region into a memory of the storage device;

determining a second persistent memory region associated with the target data transmitted to the first persistent memory region; and writing metadata corresponding to the target data into the second persistent memory region through a processor, wherein the metadata is used for describing the target data and the processor does not cache the metadata, and wherein the second persistent memory region serves as a top-level connection between an input-output hierarchical system and a CPU/memory system.

12. The data processing system according to claim 11, wherein the processor runs the instructions to perform further operations of:

writing the metadata back to the second persistent memory region.

13. The data processing system according to claim 12, wherein the processor runs the instructions to perform further operations of:

performing a barrier operation on the second persistent memory region; and writing the metadata back to the second persistent memory region after the barrier operation.

14. The data processing system according to claim 13, wherein the processor runs the instructions to perform further operations of:

performing, based on a target register, the barrier operation on the second persistent memory region.

15. The data processing system according to claim 13, wherein the processor runs the instructions to perform further operations of:

sending a target message to the target application, wherein the target message is used for indicating that the barrier operation on the second persistent memory region has been completed.

16. The data processing system according to claim 11, wherein the processor runs the instructions to perform further operations of:

determining that the target data is successfully written into the memory, and then performing a release operation on a buffer resource corresponding to the target data in the first persistent memory region.

* * * * *